US007979295B2

(12) United States Patent
Kaiser

(10) Patent No.: US 7,979,295 B2
(45) Date of Patent: Jul. 12, 2011

(54) SUPPORTING USER INTERACTION WITH A COMPUTER SYSTEM

(75) Inventor: Matthias Kaiser, Mountain View, CA (US)

(73) Assignee: SAP AG, Walldorf (DE)

( * ) Notice: Subject to any disclaimer, the term of this patent is extended or adjusted under 35 U.S.C. 154(b) by 1292 days.

(21) Appl. No.: 11/293,699

(22) Filed: Dec. 2, 2005

(65) Prior Publication Data
US 2007/0130542 A1 Jun. 7, 2007

(51) Int. Cl.
*G06G 1/12* (2006.01)
(52) U.S. Cl. ................. 705/7.22; 705/7.12; 705/21
(58) Field of Classification Search ........... 705/7.12, 705/7.22, 21, 7.11
See application file for complete search history.

(56) References Cited

U.S. PATENT DOCUMENTS

| | | | |
|---|---|---|---|
| 4,736,296 A | 4/1988 | Katayama et al. | |
| 4,914,590 A | 4/1990 | Loatman et al. | |
| 4,930,071 A | 5/1990 | Tou et al. | |
| 4,931,935 A | 6/1990 | Ohira et al. | |
| 4,974,191 A | 11/1990 | Amirghodsi et al. | |
| 4,994,967 A | 2/1991 | Asakawa | |
| 5,193,143 A | 3/1993 | Kaemmerer et al. | |
| 5,197,010 A | 3/1993 | Andersson | |
| 5,239,617 A | 8/1993 | Gardner et al. | |
| 5,255,386 A | 10/1993 | Prager | |
| 5,282,265 A | 1/1994 | Suda et al. | |
| 5,369,575 A | 11/1994 | Lamberti et al. | |
| 5,577,165 A | 11/1996 | Takebayashi et al. | |
| 5,615,342 A | 3/1997 | Johnson | |
| 5,748,158 A | 5/1998 | Kim | |
| 5,794,050 A | 8/1998 | Dahlgren et al. | |
| 5,802,504 A | 9/1998 | Suda et al. | |
| 5,819,225 A | 10/1998 | Eastwood et al. | |
| 5,953,526 A | 9/1999 | Day et al. | |
| 6,021,403 A * | 2/2000 | Horvitz et al. | 706/45 |
| 6,050,898 A | 4/2000 | Vange et al. | |
| 6,101,485 A | 8/2000 | Fortenberry et al. | |
| 6,157,310 A | 12/2000 | Milne et al. | |

(Continued)

FOREIGN PATENT DOCUMENTS

EP 52757 A3 6/1982

(Continued)

OTHER PUBLICATIONS

Kubrick and Clarke, *Speech and Language Processing*, Chapter 1, pp. 1-18, (2000) Prentice Hall.

(Continued)

*Primary Examiner* — Ramsey Refai
(74) *Attorney, Agent, or Firm* — Fish & Richardson P.C.

(57) ABSTRACT

User interaction with a computer system is supported by maintaining, in a computer system, a model comprising several concepts having properties associated therewith and any relationships existing between the several concepts. A current state of the several concepts, properties and relationships reflects a real-world situation that involves a user of the computer system. An output is made to the user that identifies at least a subset of several predefined goals, the model indicating the subset as being possible to accomplish based on the current state. At least a first action of several predefined actions in the computer system is performed, the model associating the several predefined actions with accomplishing respective ones of the several predefined goals. The first action is identified as associated with accomplishing a first goal that the user selects from the subset. The current state is updated based on performing at least the first action.

18 Claims, 5 Drawing Sheets

U.S. PATENT DOCUMENTS

| | | | |
|---|---|---|---|
| 6,286,131 | B1 | 9/2001 | Beers et al. |
| 6,557,035 | B1 | 4/2003 | McKnight |
| 6,675,159 | B1 | 1/2004 | Lin et al. |
| 6,824,049 | B2 * | 11/2004 | Lee et al. .................. 235/380 |
| 6,950,793 | B2 | 9/2005 | Ross et al. |
| 7,010,588 | B2 | 3/2006 | Martin et al. |
| 7,024,348 | B1 | 4/2006 | Scholz et al. |
| 7,027,974 | B1 | 4/2006 | Busch et al. |
| 7,158,628 | B2 | 1/2007 | McConnell et al. |
| 7,225,183 | B2 | 5/2007 | Gardner |
| 7,328,209 | B2 | 2/2008 | Das et al. |
| 7,475,133 | B2 | 1/2009 | Nuggehalli |
| 2004/0010711 | A1 * | 1/2004 | Tang et al. .................. 713/201 |
| 2004/0102960 | A1 | 5/2004 | Shimomura et al. |
| 2004/0181390 | A1 | 9/2004 | Manson |
| 2005/0054381 | A1 | 3/2005 | Lee et al. |
| 2005/0080628 | A1 | 4/2005 | Kuperstein |
| 2005/0097121 | A1 | 5/2005 | Sally et al. |

FOREIGN PATENT DOCUMENTS

| | | |
|---|---|---|
| EP | 0 692 765 | 1/1996 |
| GB | 2 153 560 | 8/1985 |

OTHER PUBLICATIONS

Fuchs et al., *Controlled Natural Language Can Replace First-Order Logic* [online] Retrieved on Jul. 20, 2005. Retrieved from the Internet: <URL: http://www.ifi.unizh.ch/groups/req/ftp/papers/ASE99.pdf>.

Sowa, John F. "Controlled English" [online]. John F. Sowa 1999, 2004, [retrieved on Jul. 20, 2005]. Retrieved from the Internet: <URL: http://www.jfsowa.com/logic/ace.htm>.

Schwitter and Fuchs, *Attempto From Specifications in Controlled Natural Language Towards Executable Specifications*. Presented at EMISA Workshop "Natürlichsprachlicher Entwurf von Informationssystemen—Grundlagen, Methoden, Werkzeuge, Anwendungen" May 28-30, 1996. Ev. Akademie Tutzing (pp. 1-15).

"Know the Rules!" [online]. European Business Rules Conference 2005, [retrieved on Jul. 20, 2005]. Retrieved from the Internet: <URL: http://www.eurobizrules.org/speakers/hoppen.htm>.

Prager et al, "Reason: An Intelligent User Assistant for Interactive Environments," IBM Systems Journal, IBM Corp., Armonk, New York, Jan. 1990, 29(1): 141-164.

Smith et al, "Intelligent Help—The Results of the EUROHELP Project," ICL Technical Journal, Oxford, GB, 7(2): 328-361.

Chadha, Vineet, "Book Review: Rob's Guide to Using VMware, by Rob Bastiaansen,"[online] [retrieved on Aug. 22, 2005] <URL: http://www.virtual-strategy.eom/article/articleview/538/1/2/ >, pp. 1-3.

Kerkez et al., "Incremental Case-Based Plan Recognition Using State Indices," [online]. [Retrieved on Aug. 22, 2005] Retrieved from the Internet: <URL: http://www.cs.wright.edu/~mcox/Papers/kerkez-cox-iccbr01.pdf> pp. 1-15.

"A Guide to GOMS Task Analysis," [online] David Kieras 1994. Retrieved from the Internet <URL: http://www-static.cc.gatech.edu/computing/classes/cs6751_98_fall/handouts/GOMS-Kieras.html> pp. 1-47.

McCarthy, John, "Actions and Other Events in Situation Calculus," [online]. Computer Science Department Stanford University Stanford, Feb. 8, 2002. Retrieved from the Internet URL <http://www-formal.stanford.edu/jmc/sitcalc/sitcalc.html> pp. 1-13.

McCarthy et al., "Some Philosophical Problems From the Standpoint of Artificial Intelligence," [online] Computer Science Dept Stanford University, 1969. Retrieved from the Internet URL<http://www-formal.stanford.edu/jmc/mcchay69/mcchay69.html>. pp. 1-51.

Newell et al., "Human Problem Solving," Prentice-Hall, Inc., 1972, pp. 87-140.

Polya, G., "How to Solve it: A New Aspect of Mathematical Method," Doubleday & Company, Inc., $2^{nd}$ Ed., 1957, pp. v-xvii.

Watson et al., Case-Based Reasoning: A Review, [online] The Knowledge Engineering Review, 1994 [retrieved on Aug. 22, 2005] <URL: http://www.ai-cbr.org/classroom/cbr-review.html >, pp. 1-33.

Amazon.com Frequently Asked Questions [online], SourceForge.net, 2005 [retrieved on Aug. 18, 2005]. <URL: http://www.amazon.com/exec/obidos/tg/browse/-/13316081/ref=pd_ys_help_iyr/103-5110429-2895835 >, pp. 1-6.

Chadha, Vineet, "Book Review: Rob's Guide to Using VMware, by Rob Bastiaansen,"[online] [retrieved on Aug. 22, 2005] <URL: http://www.virtual-strategy.com/article/articleview/538/1/2/>, pp. 1-3.

Kerkez et al., "Incremental Case-Based Plan Recognition Using State Indices," pp. 1-15.

Kieras, David, "A Guide to GOMS Task Analysis," 1994, pp. 1-47.

McCarthy, John, "Actions and Other Events in Situation Calculus," 1975, pp. 1-13.

McCarthy et al., "Some Philosophical Problems From the Standpoint of Artificial Intelligence," 1969, pp. 1-51.

Watson et al., Case-Based Reasoning: A Review, [online] The Knowledge Engineering Review, 1994, [retrieved on Aug. 22, 2005] <URL: http://www.ai-cbr.org/classroom/cbr-review.html >, pp. 1-33.

Amazon.com Frequently Asked Questions [online], SourceForge.net, 2005 [retrieved on Aug. 18, 2005]. <URL: http://www.amazon.com/exec/obidos/tg/browse/-/13316081/ref=pd_ys_help_iyr/103-5110429-2895835 >, pp. 1-6.

Jurafsky & Martin, 2000, Speech and Language Processing: An Introduction to Natural Language Processing, Computational Linguistics, and Speech Recognition, Chapter 1, pp. 1-18, Prentice Hall.

AN Sommerville, "Software Engineering," Seventh Edition, Chapter 4: Software processes and Chapter 6: Software requirements, Pearson Education, 2004, pp. 74-79 and 118-119.

EPO Non Final Office Action in App. No. 06 021 742.9, mailed Mar. 6, 2008, 11 pages.

Extended European Search Report for Application No. 06021742.9, dated Jun. 22, 2007, 3 pages.

Abraham Silberschatz et al., "Operating System Concepts," Chapter 4: Processes and Chapter 5: CPU Scheduling, 1994, pp. 97-148.

* cited by examiner

SUPPORTING USER INTERACTION WITH A COMPUTER SYSTEM

TECHNICAL FIELD

The description relates to supporting a user's interaction with a computer system by recommending goals and performing predefined actions for a user-selected goal.

BACKGROUND

Computer systems are used by many individual people who all have knowledge in a number of different domains. For example, a user has developed expertise in electronic transactions from participating in several of them over time. Many of the necessary tasks in the respective user-knowledge domains can be aided or performed by computers, and many kinds of specialized hardware, firmware and software have been developed for this purpose. Often, there is provided a dedicated software application to be run on a computer system that is available to the user, and the user is then expected to make use of the application to accomplish the tasks. Particularly, the user is expected to operate the computer system and application in a way that is consistent with, and corresponds to, a real-world situation in which the user is currently involved.

Software applications often require the user to learn technical details about how to go about doing the desired task. For example, there may be many different commands, inputs, configurations, etc. that the user would have to learn to properly operate the program. Some software applications are provided with software-based training materials that the user should consult to become proficient in using the computer. An experienced user may be able to learn the details of a new computer system (or application) relatively quickly and without problem, but for others it may require more time and effort.

As a result, some users do not learn all or even a majority of the features, options and possibilities that a particular program has to offer. This may be because the user does not have time to learn them, perceives that they are too difficult to learn, or simply does not want to learn them. In many situations this leads to the user having an unsatisfactory interaction with the computer. Also, productivity may suffer if important tasks take longer to complete or are omitted.

SUMMARY

The invention relates to supporting a user's interaction with a computer system.

In a first general aspect, the invention comprises a computer-program product tangibly embodied in an information carrier, the computer-program product comprising instructions that when executed cause a processor to perform operations to support user interaction with a computer system. The operations comprise maintaining, in a computer system, a model comprising several concepts having properties associated therewith and any relationships existing between the several concepts. A current state of the several concepts, properties and relationships reflects a real-world situation that involves a user of the computer system. An output is made to the user that identifies at least a subset of several predefined goals, the model indicating the subset as being possible to accomplish based on the current state. At least a first action of several predefined actions in the computer system is performed. The model associates the several predefined actions with accomplishing respective ones of the several predefined goals, the first action having been identified as associated with accomplishing a first goal that the user selects from the subset. The current state is updated based on performing at least the first action.

In selected embodiments, the output may be triggered by an instruction to evaluate the current state and recommend to the user any of the several predefined goals that can be accomplished in the current state. A group of the several concepts may be involved in the real-world situation, and the subset may be identified by analyzing the current state of the group, their properties and relationships. Performing at least the first action may comprise performing a sequence of operations that the model associates with accomplishing the first goal. Performing at least the first action may comprise requesting a user input relating to the real-world situation, the user input being taken into account when updating the current state. The several concepts may correspond to actors or items involved in the real-world situation. The first goal may be one selected from the group consisting of: a validation, an authentication, an authorization, a confirmation, a verification, and combinations thereof. The first goal may belong to a domain in which the user is knowledgeable, and the real-world situation may be part of the domain. The computer-program product may be implemented to provide a user interface in the computer system. The operations may further comprise making another output to the user, before performing the first action, that explains the current state. The operations may further comprise making another output to the user that explains the performance of at least the first action, the other output being generated using information from the model.

In a second general aspect, the invention comprises a computer system. The computer system includes a model comprising several concepts having properties associated therewith and any relationships existing between the several concepts. A current state of the several concepts, properties and relationships reflects a real-world situation that involves a user of the computer system. The computer system includes several predefined actions that can be performed in the computer system. The model associates the several predefined actions with accomplishing respective ones of several predefined goals. The computer system includes an output device for identifying to the user at least a subset of the several predefined goals that the model indicates is possible to accomplish based on the current state. Upon the user selecting a first goal from the subset, the computer system performs at least a first action having been identified as associated with accomplishing the first goal and updates the current state based on performing at least the first action.

In selected embodiments, a group of the several concepts may be involved in the real-world situation, and the computer system may identify the subset by analyzing the current state of the group, their properties and relationships. The computer system, in performing at least the first action, may request a user input relating to the real-world situation and take the user input into account when updating the current state.

In a third general aspect, the invention comprises a computer-program product tangibly embodied in an information carrier. The computer-program product comprises instructions that when executed cause a processor to perform operations to support user interaction with a computer system. The operations comprise generating a first output from a computer system to a user that describes a current state of the computer system. The current state is obtained from a model in the computer system that comprises several concepts having properties associated therewith and any relationships existing between the several concepts. The current state reflects a real-world situation that involves the user. The operations further comprise generating a second output to the user that identifies at least a subset of several predefined goals. The subset of several predefined goals is obtained through an indication in the model that the subset is possible to accomplish based on the current state. The operations further comprise performing at least a first action of several predefined actions in the computer system. The model associates the several predefined actions with accomplishing respective ones of the several predefined goals. The first action has been identified as associated with accomplishing a first goal that the user selects from the subset. The operations further comprise generating a third output to the user that describes the first action and how it changes the current state.

In selected embodiments, performing the first action may require user input and the operations may further comprise guiding the user in making the user input. The first and second outputs may be generated essentially simultaneously. At least a portion of the third output may be generated while performing the first action.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
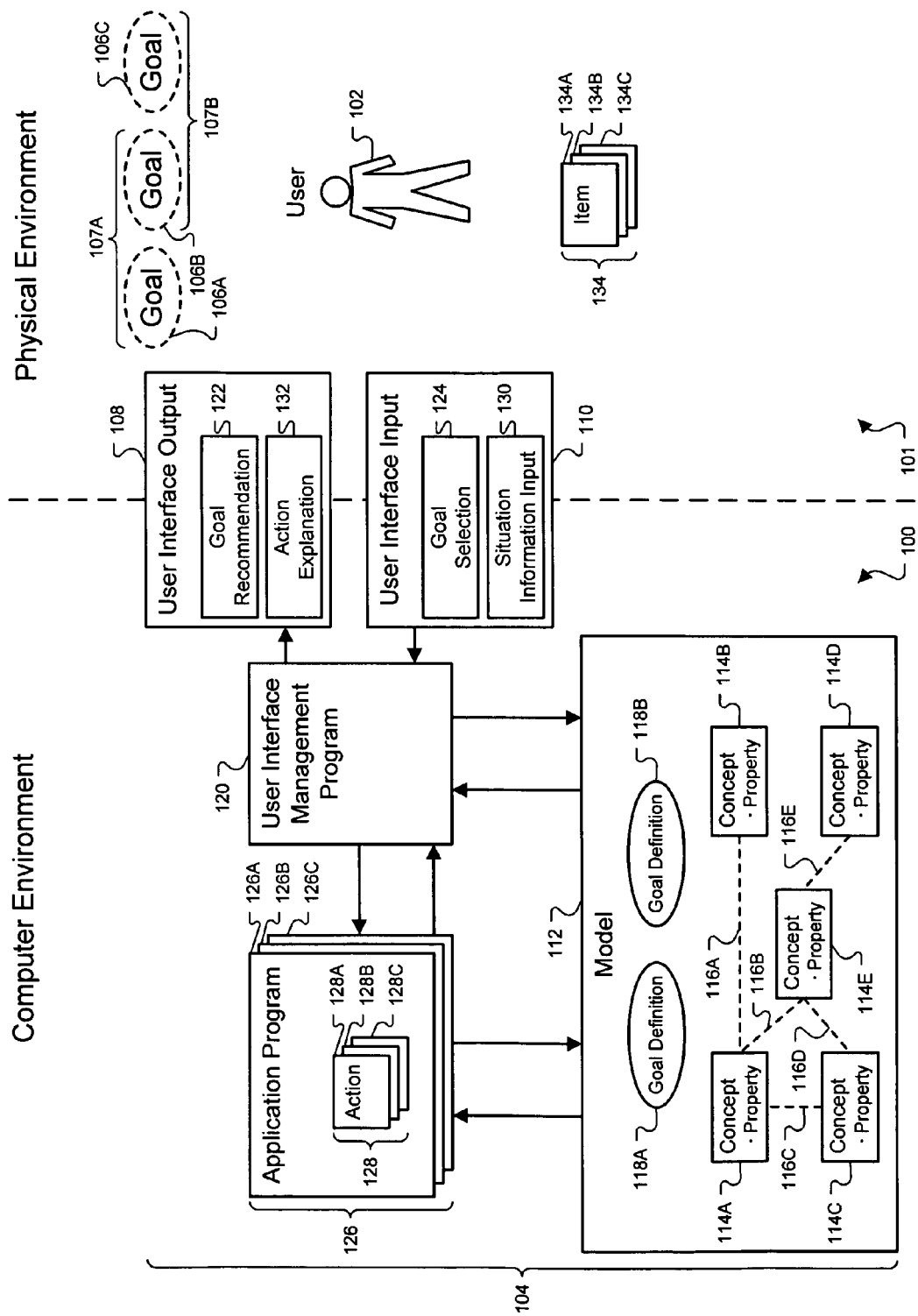
FIG. 1 is a block diagram of a computer system that performs operations to support user interaction with a computer environment.

FIG. 1 shows a block diagram of a computer environment 100 that can interact with a physical environment 101 in certain ways. Operations may be performed in the computer environment 100 that support a user 102 in the physical environment 101 in using, or otherwise interacting with, a computer system 104 in the computer environment 100. Particularly, there can be recommended to the user 102 one or more goals that have been identified as possible to accomplish, wherein accomplishing the goal(s) is associated with performing one or more actions in the computer system 104.

The user 102 in the physical environment 101, and in a particular real-world situation, may have one or more goals 106A, 106B, and 106C which can be accomplished using the computer environment 100. Each goal 106A, 106B, and 106C relates to one or more domains 107A or 107B in which the user is knowledgeable. The goals 106A-C are understandable to the user 102 as intangible concepts in a real-world situation, as indicated by their dashed outlines.

The domains 107A-B include any areas where a person can develop and maintain knowledge, such as financial transactions, business dealings, electronic exchange of information, to name only a few examples. The goals 106A-C, in turn, are specific results that can be accomplished in the respective domain(s) 107A-B. For example, goals may consist of validating, authenticating, authorizing, confirming or verifying some item or entity that exists in the physical environment 101. Goals may also consist of combinations of these or other concepts.

In supporting the user interaction, the computer system 104 may provide one or more user interface outputs 108 for recommending one or more of the goals 106A, 106B, and 106C to the user. The system may receive one or more user interface inputs 110 upon the user 102 selecting between the presented goals. In some implementations, a computer program product capable of performing these and other functions is implemented to provide a user interface in the computer system 104.

The computer system 104 includes a model that it updates from time to time. The current state of the model reflects at least one real-world situation that involves the user 102. The real-world situation may be represented by concepts having properties associated with them and by any relationships between the concepts. Particularly, the computer system 104 may maintain a model 112 including the concepts 114A-E, each having one or more properties associated therewith, and the relationships 116A-E. For example, the model indicates that the concept 114A currently has the relationship 116A with the concept 114B. In addition, the model 112 includes two or more predefined goal definitions 118A-B. Each of them corresponds to one of the goals 106A-C that exist in the domain(s) 107A-B in which the user is knowledgeable. For example, the goal definitions 118A-B may relate to validating a credit card or entering into a sales transaction. The goal definitions are predefined and can be updated, added or replaced as needed. From time to time, there may be executed an instruction in the computer system 104 to evaluate the current state and recommend one or more goals to the user. The computer system 104 may then analyze the current state using the model 112 and indicate a goal subset as being possible to accomplish in the real-world situation of the user 102. The subset may include all, some or a single one of the goal definitions 118A-B.

The following is an example of a process that can be performed in the environments 100 and 101. The system 104 makes an output to the user 102 that describes or explains a current situation to the user. The situation is reflected in a current state of the model 112. The system 104 also recommends one or more of the goals 118 to the user, the recommended goal(s) being selected as being possible to accomplish or obtain given the current state. When the user selects the goal(s) to pursue, the system can perform one or more of the actions 128 to reach the selected goal(s). Also, the system 104 may generate an output to the user that explains or describes the action(s) being performed, and may also explain how performing the action changes the current state.

A user interface management program (UIMP) 120 may be responsible for the processing in the computer system 104 that relates to the model 112, and in particular may output the subset of the goals 118A-B to the user 102, as schematically illustrated by a goal recommendation 122. The goal recommendation 122 may be output in a format such as an audible message or a message presented on a display device. The purpose of the goal recommendation 122 is to inform the user 102 what goal(s) the computer system 104 has identified, based on the current state, as being possible to accomplish. In some implementations, the goal recommendation 122 is triggered by the instruction to evaluate the current state and recommend to the user 102 the goals 118A-B that can currently be accomplished in the computer environment 100. The computer system 104 may identify the subset of the goals 118A-B by analyzing the current state, properties, and relationships of a group of concepts within the model 112 involved in the real-world situation of the user 102.

The user 102 may make a goal selection 124 in the user interface input 110 in response to the goal recommendation 122. The UIMP 120 receives the goal selection 124 and initiates the performance of one or more actions to accomplish the goal. The action(s) may be performed in any or all of several application programs 126 that are included in the computer system 104. Each of the application programs 126A, 126B, and 126C may include one or more respective actions 128A-C that are predefined instructions capable of being executed. The model 112 associates each of the goals 118A-B with one or more of the actions 128 such that, upon the determination that, say, goal 118A can currently be accomplished, the model can be accessed to determine which action(s) of the actions 128 should be performed for accomplishing the goal. For example, the UIMP 120 may cause the application program 126A to execute an action 128A that the model 112 associates with the goal 118A. In some implementations, an action may include a sequence of operations that the model 112 associates with accomplishing a goal. Actions, or several operations of an action, may be performed in more than one application program to accomplish a single goal. Additionally, performing an action may require information that is not currently stored in, or available to, the computer system 104. For example, the action(s) may include a request by the UIMP 120 for a situation information input 130 from the user 102, such as the amount of cash that the user 102 has available for a purchase.

The computer system 104 may update the model 112 based on performing any of the actions 128. This may involve eliminating or revising any of the concepts 114, updating or adding properties to any or all of the concepts 114, or adding, modifying or removing any or all of the relationships 116, to name a few examples. For example, the concepts 114, properties and relationships 116 may initially be such that the system 104, upon analyzing them, determines that it is possible to accomplish the goal 118A but not the goal 118B. After performing the prescribed action(s), the goal 118A may have been accomplished. As a result, the concepts 114, properties and relationships 116 may have changed in a way so that it is no longer deemed possible to accomplish the goal 118A in the current state (because it has already been done). In contrast, the current state of the model 112 may indicate that it is now possible to accomplish the goal 118B.

The UIMP 120 may make another user interface output 108 including an action explanation 132. The action explanation 132 may explain, using information from the model 112, the performance of an action associated with a goal or goals selected by the user 102. The action explanation 132 may be provided at the same time as the action(s) to accomplish the goal are performed, or after finishing the action(s), or by a combination of these approaches. The action explanation 132 may request the user to make the situation input 130.

Figure 2A:
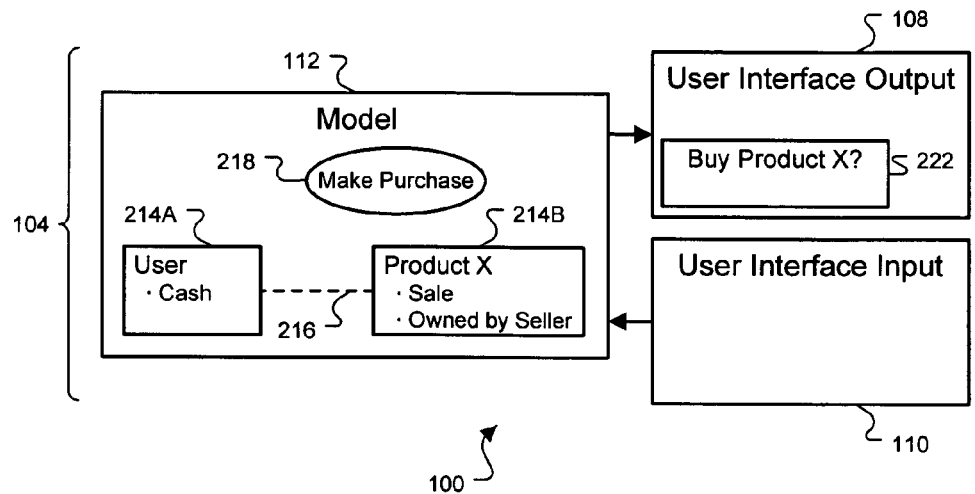
FIG. 2A shows a first output from the computer system in a first situation example.

The concepts 114 in the model 112 may correspond to actors or items 134 involved in the real-world situation of the user 102. For example, the concepts 114 may correspond to a product that the user 102 may purchase. FIG. 2A shows an example of how the computer system 104, including the model 112, may operate in a real-world situation involving the purchase of a product. The model 112 includes a concept 214A that represents the user 102, here called User 214A. The User 214A has a property called "Cash" that represents the amount of cash currently owned by the user 102 according to the computer system. The model 112 also includes a second concept called Product X 214B. The Product X 214B represents a real item (Product X) that can be bought and sold in the physical environment 101; that is, an entity in the physical environment 101, such as the item 134A shown in FIG. 1. The Product X 214B has a "Sale" property indicating that the product is currently on sale at a lower price, and an "Owned by" property that indicates who currently owns the product. There exists a relationship 216 between the User 214A and the Product X 214B in the model 112. For example, the relationship 216 exists because the user 102 has earlier expressed an interest in, or unsuccessfully attempted to purchase, the item 134A. There may exist in the model 112 a Make Purchase goal 218 that is associated with an action to purchase the item 134A. The model 112 may make an output that includes a recommended goal, "Buy Product X?" 222, to the user 102 through the user interface output 108. The user 102 may select the goal using the user interface input 110. If the user 102 selects the goal, the computer system 104 executes the action or operations associated with the Make Purchase goal 218. In this example, that involves initiating or carrying out the transaction that results in the user 102 purchasing the item 134A represented by the concept Product X 214B.

Figure 2B:
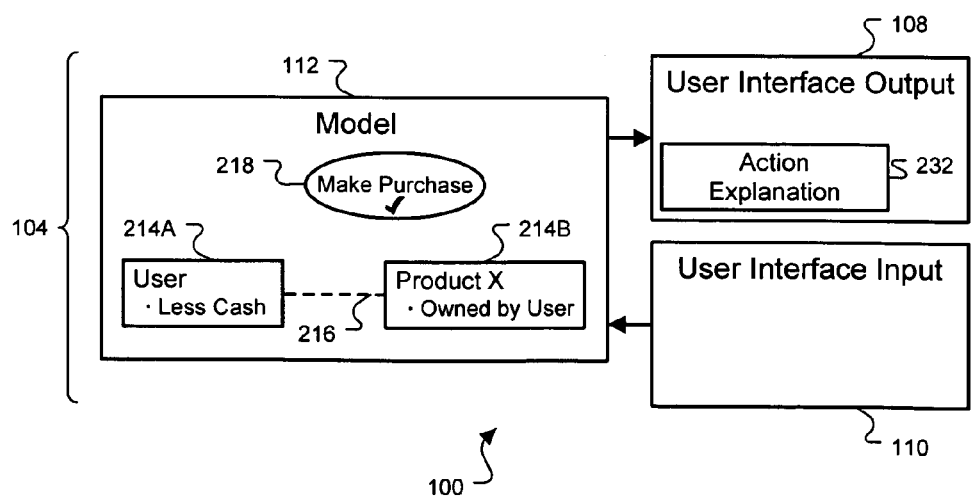
FIG. 2B shows a second output from the computer system in the first situation example.

The computer system 104 then updates the model 112 to reflect the current state of the user's real-world situation. FIG. 2B shows the updated model 112 that represents the user's real-world situation after purchasing the item 134A. The concept User 214A now has a property of Less Cash and the concept Product X 214B now has a property of Owned by User. The relationship 216 between the User 214A and the Product X 214B now represents the purchase of the item 134A by the user 102. In this example, the goal definition 218 is no longer considered possible to accomplish after the transaction has been completed. This may be because there only exists a single Product X, because the user 102 does not have enough cash to buy another one, or because the user 102 is not likely to need more than one of this type of product. The computer system 104 may make an output that includes an Action Explanation 232 of the operations that occur when the user 102 purchases item 134A. For example, the computer system 104 issues a statement to the effect that, per the user's instruction through the input 110, the system 104 has effectuated a purchase of the Product X which reduced the user's cash by a specific amount.

Figure 3A:
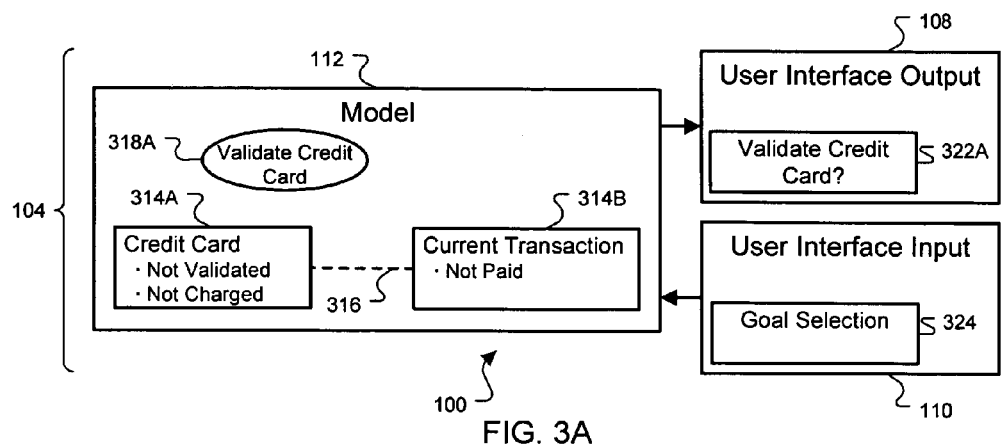
FIG. 3A shows a first output from the computer system in a second situation example.

FIG. 3A shows the model 112 being used in a credit card transaction situation. For example, the system 104 is implemented at a point-of-sale where buyers and sellers enter into transactions that can be paid for by credit card. In this example, the credit card should be validated, for example to determine that the credit limit will not be exceeded, before it is charged as part of completing the transaction. The seller may therefore enter the specifics of the transaction, such as the identity of the item, the sale price and the credit card number, into the system 104, for example using one or more automated readers (not shown). The system 104 provides that the credit card can be validated and charged without the user 102 having to be knowledgeable in the workings of the particular application program(s) 126 that is responsible for these operations.

The model 112 includes a concept Credit Card 314A having properties of * Not Validated and Not Charged. The Credit Card concept 314A corresponds to the card that the buyer is using for the transaction. The model 112 also includes a concept Current Transaction 314B having a property of Not Paid. This concept corresponds to the transaction that is taking place. A relationship 316 exists between the Credit Card 314A and the Current Transaction 314B because the credit card and transaction are associated with each other. The model 112 also includes a predefined goal Validate Credit Card 318A that is associated with operations needed to validate a credit card. Upon analyzing the model 112 and determining that the transaction concept 314B needs to be paid, the system 104 determines that the transaction can be paid if the credit card is first validated and thereafter charged for the amount of the sale. The model 112 therefore makes an output that recommends a goal, "Validate Credit Card?" 322A, to the user 102 through the user interface output 108. This may be in addition to any other goal(s) currently being recommended to the user 102. The user 102 may select the goal using the user interface input 110. If the user 102 selects the goal, the computer system 104 initiates the action or operations associated with the Validate Credit Card goal 318A, for example by contacting a remote server of the credit card company. If the credit card is determined to be valid for the transaction, the system 104 updates the model 112 to reflect the current state of the user's real-world situation (i.e., that the credit card is valid).

Figure 3B:
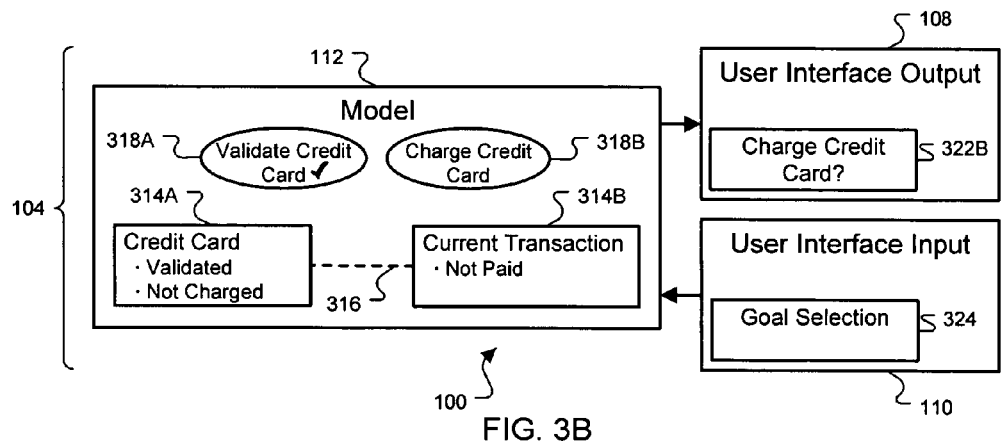
FIG. 3B shows a second output from the computer system in the second situation example.

FIG. 3B shows the updated model 112 that represents the user's real-world situation after the credit card has been validated. The concept Credit Card 314A now has properties of Validated and Not Charged. The concept Current Transaction 314B and the relationship 316 of the concept Credit Card 314A with it remain unchanged. When the system 104 analyzes the current state of the model 112, it may determine that another predefined goal, a Charge Credit Card goal 318B, is now available. This is because the Credit Card concept 314A now has the property Validated.

The model 112 may make an output that includes a recommended goal, "Charge Credit Card?" 322B, to the user 102 through the user interface output 108. The user 102 may select the goal using the user interface input 110. If the user 102 selects the goal, the computer system 104 executes the action or operations associated with the Charge Credit Card goal 318B, to charge the credit card for the transaction, and updates the model 112 to reflect the current state of the user's real-world situation.

Figure 3C:
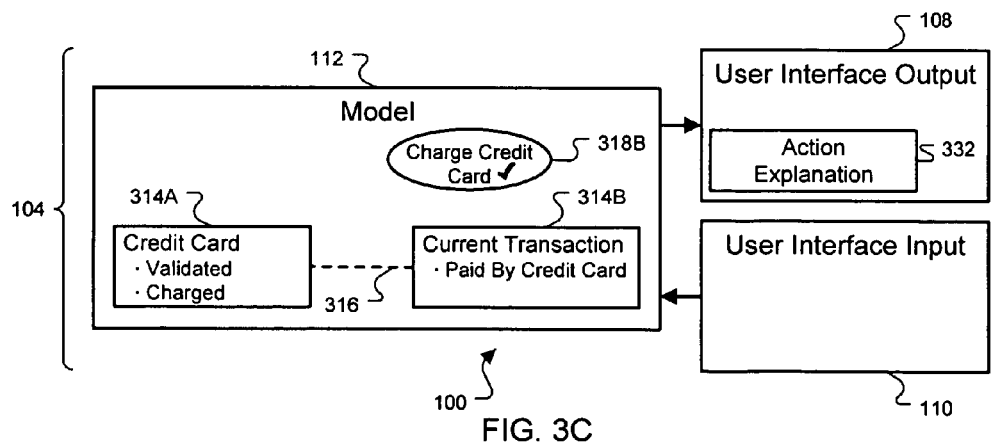
FIG. 3C shows a third output from the computer system in the second situation example.

FIG. 3C shows the updated model 112 that represents the user's real-world situation after the credit card has been charged. The concept Credit Card 314A now has properties of Validated and Charged, and the concept Current Transaction 314B now has a property of Paid by Credit Card. The relationship 316 between the charged credit card and the paid transaction reflects which credit card was used to pay for what transaction. The goal description Charge Credit Card 318B is now "checked off" to indicate that this goal is presently not recommended as being possible to accomplish (because it has already been accomplished). The computer system 104 may make an output that includes an Action Explanation 332 of the operations that were performed upon validating the credit card and charging it.

Figure 4:
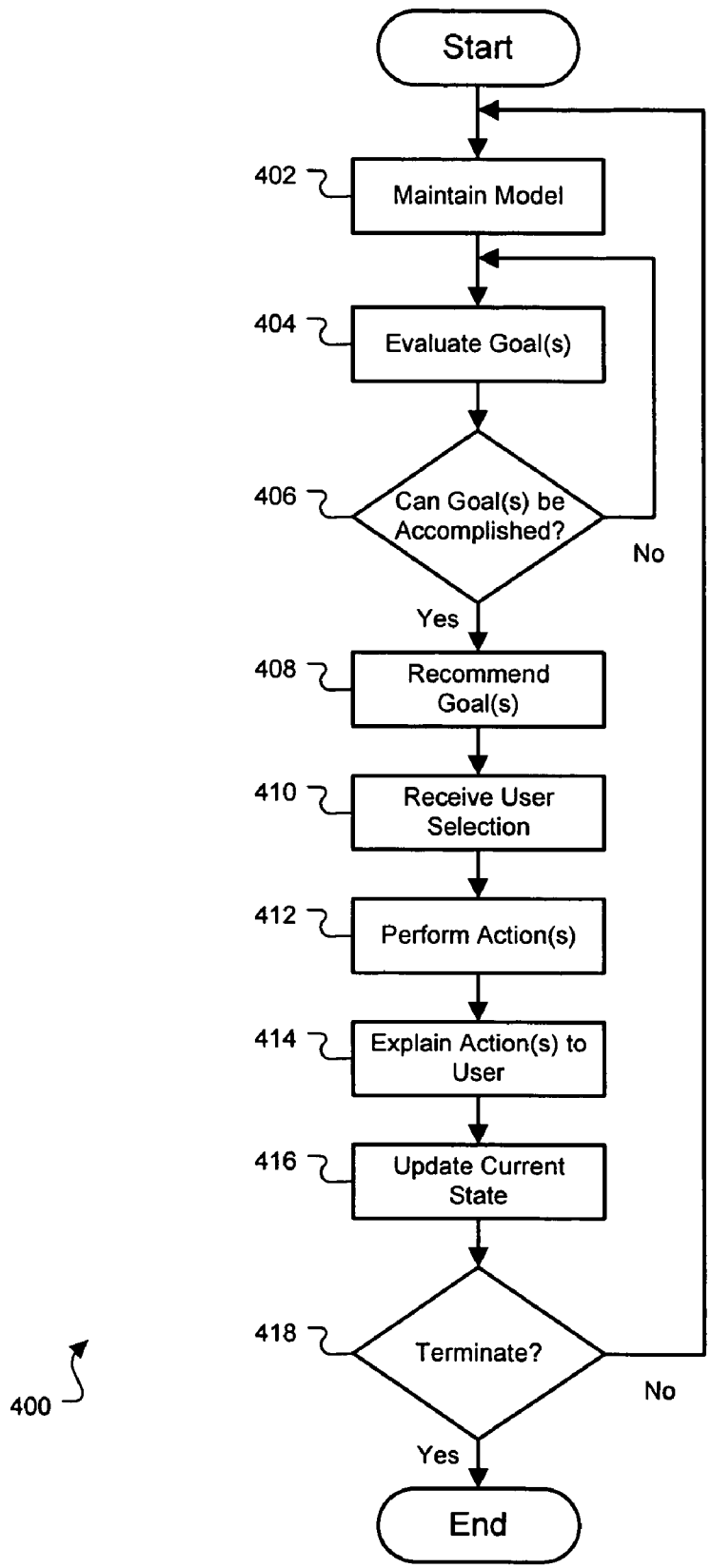
FIG. 4 is a flow chart of exemplary operations that a computer system may perform to support user interaction with a computer environment.

FIG. 4 is a flow chart of exemplary operations 400 that the computer system 104 can perform. A processor executing instructions stored in a computer program product can perform the operations 400. The operations 400 begin in step 402 with maintaining a model that represents a real-world situation of a user. The model may include concepts having properties associated with them and relationships between the concepts. The model is maintained throughout the steps of the operations 400, and is updated at times as will be described. For example, the computer system 104 maintains the model 112, as shown in FIG. 1.

In step 404, the predefined goals within the model are evaluated to identify a subset of goals that may be accomplished in the current state of the model. In some implementations, a goal to be included in the subset of goals may be identified by analyzing the current state of a group of concepts within the model. For example, the system 104 may analyze the goal definition 218 in the situations shown in FIGS. 2A and 2B, or the goal definitions 318A and 318B in the situations shown in FIGS. 3A-C.

In step 406, if no achievable goals were identified in step 404, the operations 400 return to step 404 where the predefined goals continue to be evaluated. For example, in the situations shown in FIGS. 2B and 3C no goal(s) were immediately identified for accomplishment. If at least one goal is identified in step 404, the operations 400 proceed to step 408.

In step 408, the subset of the predefined goals is recommended to the user. For example, the system 104 recommends the product purchase in FIG. 2A, the credit card validation in FIG. 3A and the credit card charge in FIG. 3B. The current state may also be explained or described to the user, in the same or a different output.

In step 410, a goal selection is received from the user. The user may make an input in a user interface by selecting a goal or goals from the subset of the predefined goals presented to the user in step 408. For example, in FIG. 2A the user chooses to make the purchase, and in FIG. 3A the user chooses to validate, and thereafter in FIG. 3B to charge, the credit card.

In step 412, an action or actions associated with the goal(s) selected by the user in step 410 are performed. The associations between the goals and their respective actions may be defined in the model that represents the real-world situation. Each of the actions may include a sequence of operations that accomplish the goal associated with them. In addition, an action may include a request for a user input relating to the real-world situation. For example, the system 104 initiates the purchase of the product, or validates and charges the credit card. There may be performed a procedure in which the user is guided in making the appropriate input(s).

In step 414, the performance of the action or actions is explained to the user using information from the model. The explanation may be interleaved with performance of the action(s). For example, the system 104 can give the user 102 continuous feedback on specific operations that are being performed, optionally in combination with requesting user input. There may also be explained or described how the current state is affected by the performed action(s).

In step 416, the current state of the model is updated. Changes to the concepts, their properties, and the relationships between the concepts that may have resulted from the action or actions performed in step 412 are made in the model to reflect the new state of the real-world situation of the user. For example, in FIG. 2B the system 104 updated the User concept 214A to show less cash after completing the purchase, and that the product now is owned by the user 102. In FIGS. 3B and 3C the system 104 updated the Credit Card concept 314A to reflect that it had been first validated, and then charged. Similarly, the Transaction concept 314B was updated to show that the price had been paid.

In step 418, the operations 400 may terminate, such as by receiving a termination command input from the user. If the operations 400 do not terminate in step 418 they may return to step 402.

Figure 5:
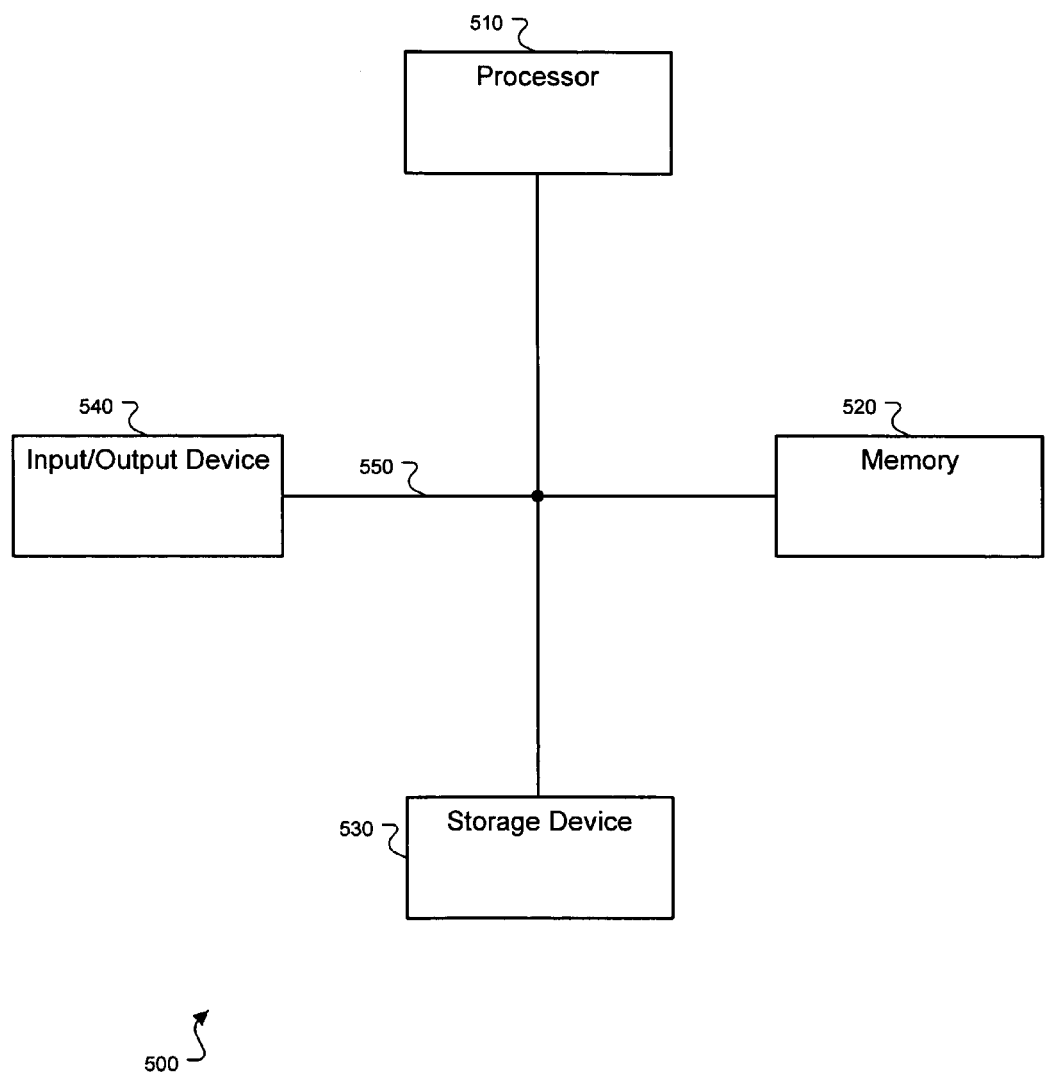
FIG. 5 is a block diagram of a general computer system.

FIG. 5 is a block diagram of a computer system 500 that can be used in the operations described above, according to one embodiment. For example, the system 500 may be included in the computer system 104.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-program product tangibly embodied in a machine-readable storage device, the computer-program product comprising instructions that when executed cause a processor to perform operations to support user interaction with a computer system, the operations comprising:

maintaining, in a computer system, a model comprising several concepts that each has at least one associated property, the model comprising any relationships existing between the several concepts, wherein a first state of the several concepts, properties and relationships reflects a real-world situation that involves a user of the computer system, the concepts of the model corresponding to respective real-world actors and items involved in the real-world situation;

identifying, using the model, an achievable first subset of several predefined goals as being possible to accomplish based on the first state, each goal in the first subset associated with at least one predefined first action for accomplishing the goal, wherein any of the predefined goals that is not included in the achievable first subset is unachievable based on the first state of the model;

making an output to the user that identifies at least a portion of the achievable first subset of the several predefined goals;

receiving a first user selection of an output goal from the achievable first subset of the several predefined goals;

in response to receiving the first user selection, performing in the computer system at least the first action for the first goal to progress towards accomplishing the first goal;

in response to performing the at least first action, providing second concepts, properties and relationships;

updating the first state of the model to a second state of the model based on the second concepts, properties and relationships, the second state of the model reflecting another real-world situation after the first action; and identifying, using the model, an achievable second subset of several predefined goals as being possible to accomplish based on the second state, each goal in the second subset associated with at least one predefined second action for accomplishing the goal.

2. The computer-program product of claim 1, wherein the output is triggered by an instruction to evaluate the first state and recommend to the user any of the first subset of the several predefined goals that can be accomplished in the first state.

3. The computer-program product of claim 1, wherein a group of the several concepts are involved in the real-world situation, and wherein the first subset is identified by analyzing the first state of the group, their properties and relationships.

4. The computer-program product of claim 1, wherein performing at least the first action comprises performing a sequence of operations that the model associates with accomplishing the first goal.

5. The computer-program product of claim 1, wherein performing at least the first action comprises guiding the user in making at least one input.

6. The computer-program product of claim 1, wherein performing at least the first action comprises requesting the first user input relating to the real-world situation, the first user input being taken into account when updating the first state.

7. The computer-program product of claim 1, wherein the first goal is one selected from the group consisting of: a validation, an authentication, an authorization, a confirmation, a verification, and combinations thereof.

8. The computer-program product of claim 1, wherein the first goal belongs to a domain in which the user is knowledgeable, and wherein the real-world situation is part of the domain.

9. The computer-program product of claim 1, implemented to provide a user interface in the computer system.

10. The computer-program product of claim 1, wherein the operations further comprise making another output to the user, before performing the first action, that explains the first state.

11. The computer-program product of claim 1, wherein the operations further comprise making another output to the user that explains the performance of at least the first action, the other output being generated using information from the model.

12. A computer system comprising:

a model comprising several concepts that each has at least one associated property, the model comprising any relationships existing between the several concepts, wherein a first state of the several concepts, properties and relationships reflects a real-world situation that involves a user of the computer system, the concepts of the model corresponding to respective real-world actors and items involved in the real-world situation, the model adapted for identifying an achievable first subset of several predefined goals as being possible to accomplish based on the first state, each goal in the first subset associated with at least one predefined first action for accomplishing the goal, wherein any of the predefined goals that is not included in the achievable first subset is unachievable based on the first state of the model, the model stored in a machine-readable storage device;

several predefined actions that can be performed in the computer system, the model associating the several predefined actions with accomplishing respective ones of several predefined goals, the predefined actions stored in a machine-readable storage device; and an output device for identifying to the user at least a portion of the achievable first subset of the several predefined actions, wherein, upon the user selecting a first goal from the identified portion of the achievable first subset, the computer system (1) performs at least the first action for the first goal to progress towards accomplishing the first goal; (2) provides second concepts, properties and relationships, the providing based on performing the first action; (3) updates the first state of the model to a second state of the model based on the second concepts, properties and relationships, the second state of the model reflecting another real-world situation after the first action; and (4) identify, using the model, an achievable second subset of several predefined goals as being possible to accomplish based on the second state, each goal in the second subset associated with at least one predefined second action for accomplishing the goal.

13. The computer system of claim 12, wherein a group of the several concepts are involved in the real-world situation, and wherein the computer system identifies the first subset by analyzing the first state of the group, their properties and relationships.

14. The computer system of claim 12, wherein the computer system, in performing at least the first action, requests a user input relating to the real-world situation and takes the user input into account when updating the first state.

15. The computer-program product of claim 1, wherein the operations further comprise generating another output to the user that describes performance of the first action and that explains how performing the first action changes the first state of the model.

16. The computer-program product of claim 1, wherein updating the first state of the model comprises at least one of eliminating a concept, revising a concept, updating a property to a concept, adding a property to a concept, adding a relationship, modifying a relationship, and removing a relationship.

17. The computer system of claim 12, wherein the output device generates another output to the user that describes performance of the first action and that explains how performing the first action changes the first state of the model.

18. The computer system of claim 12, wherein updating the first state of the model comprises at least one of eliminating a concept, revising a concept, updating a property to a concept, adding a property to a concept, adding a relationship, modifying a relationship, and removing a relationship.

* * * * *